United States Patent [19]
Nose

[11] Patent Number: 6,064,132
[45] Date of Patent: May 16, 2000

[54] ARMATURE STRUCTURE OF A RADIAL RIB WINDING TYPE ROTATING ELECTRIC MACHINE

[75] Inventor: Tamotsu Nose, Nagano, Japan

[73] Assignee: Sankyo Seiki Mfg. Co., Ltd., Nagano-ken, Japan

[21] Appl. No.: 09/150,449

[22] Filed: Sep. 9, 1998

[30] Foreign Application Priority Data

May 8, 1998 [JP] Japan .................................. 10-126158

[51] Int. Cl.[7] .............................. H02K 1/00; H02K 1/12; H02K 1/22
[52] U.S. Cl. .......................... 310/216; 310/258; 310/261
[58] Field of Search .................................. 310/216, 258, 310/259, 254, 261

[56] References Cited

U.S. PATENT DOCUMENTS

| | | |
|---|---|---|
| 3,130,336 | 4/1964 | Morris . |
| 4,818,911 | 4/1989 | Taguchi et al. .......................... 310/259 |
| 4,893,042 | 1/1990 | Tanaka ..................... 310/216 |
| 4,912,353 | 3/1990 | Kondo et al. ........................... 310/259 |
| 4,940,913 | 7/1990 | Fritzsche .................................. 310/216 |
| 5,176,946 | 1/1993 | Wieloch .................... 428/138 |
| 5,525,852 | 6/1996 | Fanning et al. .......................... 310/217 |
| 5,604,389 | 2/1997 | Nitta et al. .............................. 310/67 R |
| 5,668,427 | 9/1997 | Morita ...................................... 310/216 |
| 5,763,978 | 6/1998 | Uchida et al. ........................... 310/215 |
| 5,786,650 | 7/1998 | Uchida et al. ........................... 310/156 |
| 5,798,583 | 8/1998 | Morita ........................................ 310/42 |
| 5,859,486 | 1/1999 | Nakahara et al. ....................... 310/254 |

Primary Examiner—Clayton LaBalle
Attorney, Agent, or Firm—McAulay Nissen Goldberg Kiel & Hand, LLP

[57] ABSTRACT

A structure of an armature of a radial rib winding type rotating electric machine which constitutes at least a member of a stator or a rotor is disclosed. The structure comprises a laminated core having an annular core portion, a radial rib-like core portion that extends radially from the annular core portion toward an opposing member and a facing core portion that is formed at the edge of the radial rib-like core portion to face the opposing member. A coil is wound about the radial rib-like core portion of the laminated core. A partial laminating core is laminated on at least the facing core portion of the armature to enlarge the facing surface thereof opposite the opposing member. The total lamination thickness of the facing core portion and partial laminating core portion is larger than the thickness of the radial rib-like core portion.

38 Claims, 6 Drawing Sheets

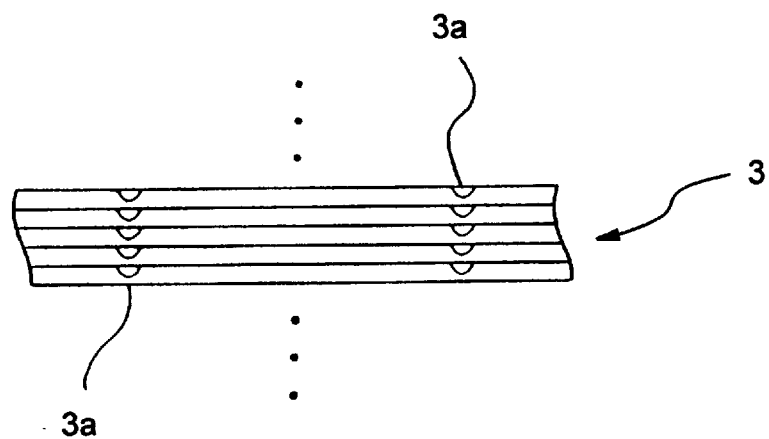
F I G. 3
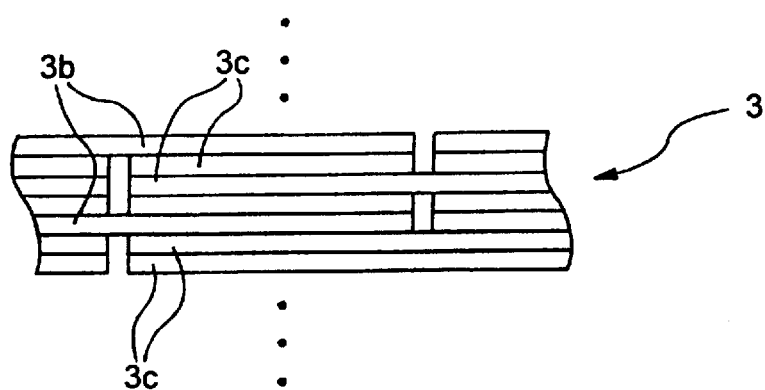
F I G. 4
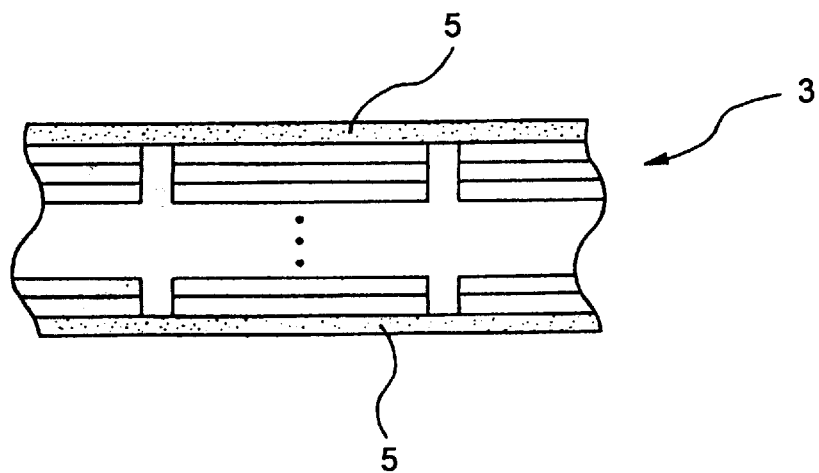
F I G. 5

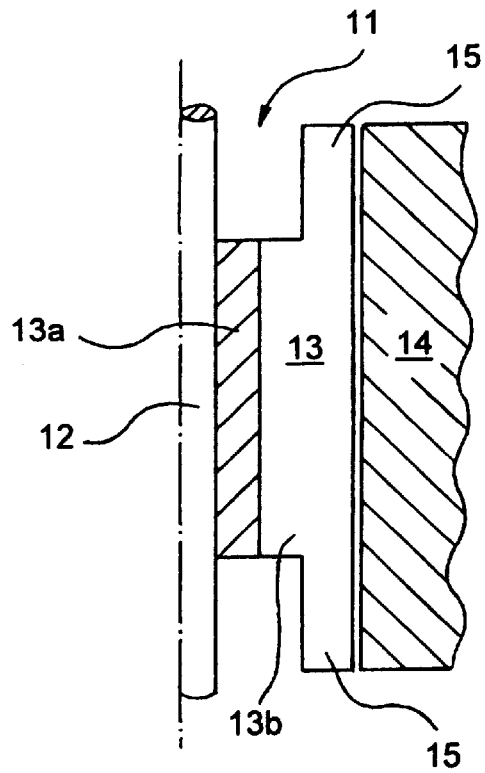
F I G. 8
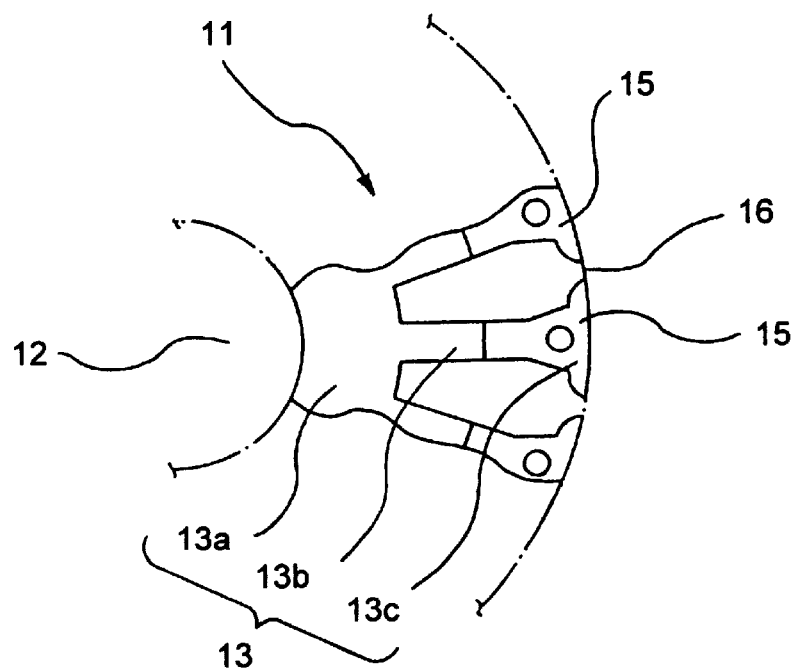
F I G. 9

ARMATURE STRUCTURE OF A RADIAL RIB WINDING TYPE ROTATING ELECTRIC MACHINE

BACKGROUND OF THE INVENTION a) Field of the Invention

The present invention relates to an armature structure of a radial rib winding type electric rotating machine, in which a coil is attached to a rib-like core portion formed radially in a laminated core.

b) Description of the Related Art

Generally, a rotating electric machine that needs sine waveform magnetic field in an air gap portion employs a distributed winding for a winding method. For example, in a three-phase inductance motor illustrated in FIGS. 12 and 13, a stator S is arranged to surround an outer circumference of a rotor R, and a core portion SC1 that extends in a radial rib-shape is formed to a laminated core SC of an armature constituting the stator S. A coil SL is superposed, shifting slots SC2 between radially rib-shaped core portions.

Recently global environmental issues have become serious, requiring energy-saving and power-saving as a first priority. Environmental issues are especially dominated by the issue of power consumption these days, and motors consume more than half of the available power. For this reason, it is very important to increase motor efficiency and decrease loss (of power) as much as possible. Also, the same consideration is given to generators that generate electric power.

OBJECT AND SUMMARY OF THE INVENTION

A primary object of the present invention is to provide a modified armature structure of a radial rib winding type rotating electric machine in which a coil is wound about a radial rib core portion, for higher efficiency (enhanced property), to greatly improve the efficiency value.

The present invention relates to a property-improved structure of the rotating electric machines including motors and generators. Motors convert electrical energy to mechanical energy; generators convert mechanical energy to electrical energy. Therefore, motors and generators are basically the same in structure and configuration. It is, therefore, possible to use a motor as a generator, and vice versa. For this reason, all the following description will be referred to a motor.

Generally, output and torque are used as an index of the motor's property. However, the motor's property cannot be expressed in an absolute value by the above indices because the output and torque vary depending on applied voltage, the number of windings, radiating condition, design, etc. The efficiency value is another index of the motor's property which properly expresses the relationship between the output and the loss. However, efficiency value also varies depending on loads or the number of rotations, and therefore, with the initial zero output, the efficiency value is also zero. This also cannot be an absolute index to express the motor's property.

To improve the efficiency value of a motor, it is a basic to accurately understand what the motor's property is, what the efficiency is, and how they are determined. As a result of studies done by the present inventor, the following was understood.

The absolute index of the motor's property is a proportional constant that expresses (determines) the relationship between the torque generated and the loss (copper loss) caused. In a motor without magnets, the proportional constant equals torque/copper loss; in a motor having magnets, the proportional constant is $(\text{torque})^2/\text{copper loss}$. In other words, the proportional constant that expresses the relationship between the torque and the copper loss caused when the current is applied never changes even when the applied voltage, the number of windings (with the same space factor), and the load condition are changed. Thus, it is understood that this proportional constant is an absolute index that expresses the motor's property.

Also, the efficiency value is output/input=output/(output+ loss), where the output is the number of rotation x torque, the number of rotations can be expressed by the applied voltage and the loss, and the loss mainly means the copper loss. Therefore, it is understood that the efficiency value is mostly determined by the proportional constant.

To enhance the motor's property (to increase the efficiency), various attempts have been made, such as making large motors, employing magnets having high energy product, and increasing the space factor of the winding. However, the motor's property is enhanced by changing the condition of factors that determine the proportional constant.

Next described are the reasons why this proportional constant value determines the absolute index of the motor's property and the factors that determine this proportional constant value.

The magnitude of the motor torque depends on the amount of the change in magnetic energy caused by relative move between the primary and secondary sides (currents) which are placed opposite one another. There are two kinds of magnetic energies: one generated and retained by a self-inductance L between the primary and secondary sides (currents); the other generated and retained by a mutual-inductance M between the primary and secondary sides (currents). Which magnetic energy is used for driving depends on the type and structure of the motor. Inductance motors, DC motors, and brushless motors use the magnetic energy caused by M while reluctance motors use the magnetic energy caused by L.

When the configuration such as the number of magnet poles is set, the magnitude of the torque generated at primary and secondary currents $I_1$ and $I_2$ is mostly determined by the maximum value of the magnetic energy, that is, the magnitude of the self-inductance L or the mutual-inductance M. The magnitude of the magnetic energy by the self-inductance L is expressed by $(\frac{1}{2}) \times L \times I^2$; the magnitude of the magnetic energy generated by the mutual-inductance M is expressed by $M \times I_1 \times I_2$. Most of the normal motors other than reluctance motors employ the mutual-inductance M for driving. In many of the motors that do not use magnets, such as inductance motors and universal motors, the first current $I_1$ is proportional to the secondary current $I_2$. Therefore, the magnetic energy can be expressed by $M \times I_1 \times I_2 = M \times I^2$ where I represents the total current. When a magnet is used for only one side (assuming, it is the primary side), because the magnet is an electromagnet of steady current, the current $I_1$ is constant and $M \times I_1 = \phi$(effective magnetic flux). Therefore, the magnetic energy thereof can be expressed by $M \times I_1 \times I_2 = \phi \times I$.

Since the copper loss is a resistance loss, it can be expressed by $R \times I^2$. In a motor without magnets, the proportional constant that determines the relationship between the torque and the copper loss is torque/copper loss. Consequently, the proportional constant can be expressed by L/R or M/R. With a motor having magnets, the proportional constant is $(\text{torque})^2/\text{copper loss}$, bringing $M^2/R$ as a result.

Considered next is the factors that determine L, M, and R. Eliminating the factor, the number of winding turns of coil, which affects equally L, M, and R, L and M can be mainly expressed by the primary-secondary-sides facing surface S and the air gap length, g. For the motor having magnets, material characteristics, size, and shape of the magnet are further included as the factors. R is mainly determined by a coil cross-sectional surface A and the coil length, I, per winding turn. Considering that the air gap length, g, and the magnet components are mostly fixed, the above mentioned proportional constant can be expressed by only main components as follows:

a) motor without magnets (inductance, universal): S×A/I=S/coil component b) motor having magnets: $S^2 \times A/I = S^2$/coil component c) reluctance motor: S×A/I=S/coil component It is understood that improving the main components constituting the proportional constant to increase the proportional constant value enhances the motor's property, resulting in improving the efficiency value.

Observing the proportional constant in conventional products, one finds that conventional rotating electric machines have a drawback. In other words, the common factor to determine the numerator of the formula for the proportional constant is the primary-secondary magnetic facing surface S. The more the facing surface S is enlarged, the higher the proportional constant and efficiency value become.

It is understood, however, from the example of the three-phase inductance motor (see FIG. 12) which is a typical rotating electric machine, that the ratio of the height H3 of the primary-secondary magnetic-facing portion with respect to the entire motor height H2 in the axial direction is extremely small. This is because, as described before, the winding height H1 occupies much of the axial space. As a result, the above mentioned magnetic-facing surface S is extremely small.

If, without changing the condition of the coil components, the magnetic-facing surface can fill the axial motor space fully, the above mentioned proportional constant can be greatly improved. This can easily reduce the loss in the same torque (or output) to ½ or ⅓, for example.

This condition is possibly created depending on the structure. In other words, it is structurally possible to increase the height of the primary-secondary magnetic facing surface to a great extent without degrading the coil components. By employing such a structure, it is possible to greatly increase the efficiency value and decrease the loss.

According to the present invention, the radial rib winding and the partial laminating core are cooperatively used to optimally use the space in the height direction, which has been the drawback of the conventional structure. Because the coil component is not degraded, the above mentioned proportional constant can be greatly improved. Consequently, the loss will be decreased, thus improving the efficiency value.

More specifically, the following effects can be obtained.

The partial laminating core structure enables one to fully use the space in the motor height direction as the magnetic facing surface. Moreover, even such a structure barely affects the winding and degrades the coil component. On the contrary, the drawback of the conventional radial rib winding structure, which the coil length per winding turn becomes long with the increased core lamination thickness, can be resolved with the use of the partial laminating core structure.

Also, other methods of effectively using the space in the motor height direction as a magnetic facing surface are so-called magnetic flux collecting yoke structure and magnetic powder yoke structure. However, the partial laminating core structure is superior in space utilization percentage, magnetic property, processability, etc. For example, with the collected-magnet yoke structure, the space cannot be fully used, partially because of magnetic saturation, the difficulty of shaping, and the high die cost. The magnetic powder yoke structure also has drawbacks such as poor magnetic properties and high die cost.

BRIEF DESCRIPTION OF THE DRAWINGS

In the drawings:

FIG. 3 is a partially magnified side view showing an structure of a core piece constituting the partial laminating core of FIGS. 1 and 2;

FIG. 4 is a partially magnified side view showing another structure of the core piece of the partial laminating core;

FIG. 5 is a partially magnified side view showing another structure of the core piece of the partial laminating core;

FIG. 8 is a schematic vertical cross-sectional view showing an example in which the present invention is applied to a rotor of an inductance motor;

FIG. 9 is a partial plan view of the rotor of FIG. 8;

DESCRIPTION OF THE PREFERRED EMBODIMENTS

Embodiments of the present invention will be described.

Figure 1:
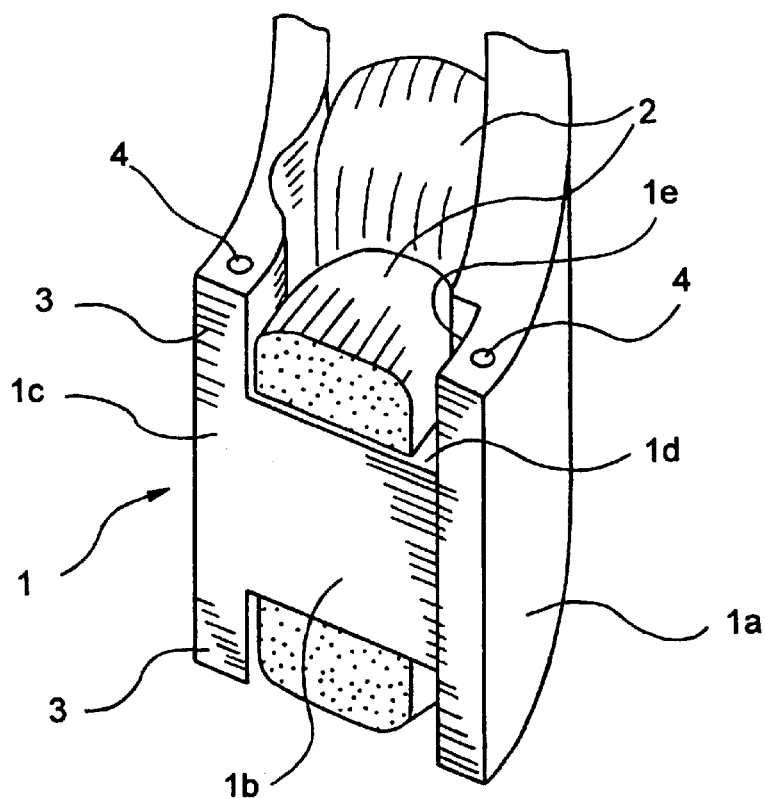
FIG. 1 is a perspective outlook showing an armature structure of a stator of an inductance motor of an embodiment of the present invention.

In an embodiment illustrated in FIG. 1, the present invention is applied to a stator of a motor. Inside an inner circumference of an annular core portion 1a of a laminated core 1 attached to an inner circumferential wall of a stator frame (not illustrated), a plurality of radial rib-like core portions 1b are integrally formed such that they extend radially and are spaced at a predetermined distance in the circumferential direction. Also, slots are created between circumferentially adjacent radial rib-like core portions 1b, and a coil 2 attached inside each slot is wound about each of the radial rib-like core portions 1b. At the radially inner side of each of the radial rib-like core portions 1b, a facing core portion (magnet pole portion) 1c that faces a rotor (not illustrated) is formed.

Figure 2:
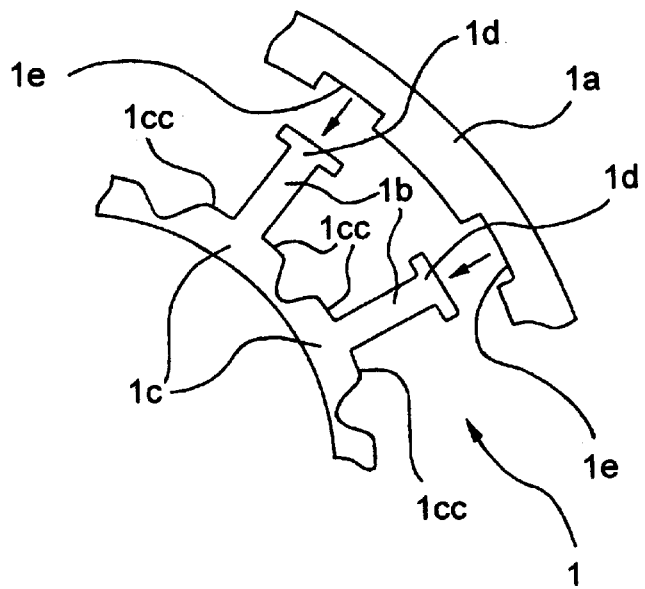
FIG. 2 is a partial plan view of a laminated core of FIG. 1.

As mentioned above, the laminated core 1 consists of the annular core portion 1a, the radial rib-like core portion 1b, and the facing core portion 1c. While the radial rib-like core portion 1b is formed integrally with the facing core portion 1c, as illustrated in FIG. 2, the radially outer side of the radial rib-like core portion 1b is formed separately from the annular core portion 1a. The coil 2 is first wound about the separate unit, the radial rib-like core portion 1b, and then, a protruding portion 1d, which is formed at the radially outer edge of the radial rib-like core portion 1b and formed to fit in a recess portion 1e formed in the annular core portion 1a, is coupled in the axial direction for engagement.

The facing core portions 1c adjacent in the circumferential direction are connected to one another to constitute an integral annular member. A core piece constituting each layer of the facing core portion 1c is made of a plate-like member which is a single unit in the circumferential direction. With this structure, even when partial laminating cores 3 (to be described next) are laminated on the facing core portion 1c, a sufficient mechanical strength can be maintained.

The laminated core 1 is made by axially laminating core pieces of silicon steel plates that are punched out in a predetermined shape, and consists of a laminated unit in which core pieces as illustrated in FIG. 2 are laminated in a predetermined height. Core pieces in a shape corresponding to that of the facing core portion 1c are further laminated on the facing core portion 1c of the laminated unit in a predetermined height. In other words, the laminated unit of the core pieces having the radial rib-like core portion 1b and the facing core portion 1c constitutes an axially central portion of the laminated core 1. The partial laminating core 3 is laminated axially at both ends of the portion corresponding to the facing core portion 1c of the laminated unit. The core pieces constituting the partial laminating core 3 and the laminated core 1 are fixed by a lamination caulking 4.

The partial laminating core 3 enlarges the axially facing surface which faces the rotor (not illustrated). The total lamination thickness in the axial direction (lamination direction) of the partial laminating core 3 and the facing core portion 1c is larger than the thickness of the radial rib-like core portion 1b. Also, the total lamination thickness of the facing core portion 1c and partial laminating core 3 is larger than the axial winding height of the coil 2. The facing core portion 1c is formed such that the end surface 1cc thereof, which is continuous to the radial rib-like core portion 1b, extends perpendicular to the projecting direction (radial direction) of the radial rib-like core portion 1b or in the circumferential direction, whereby a passing area of a magnetic path to be formed in the axial direction will be enlarged.

On the other hand, the axial (lamination direction) thickness of the facing surface of the rotor is larger than the thickness of the radial rib-like core portion 1b and nearly the same as the aforementioned total lamination thickness. With this configuration, the partial laminating core 3 is confronted to the rotor. In addition, the lamination thickness of the annular core portion 1a is larger than the thickness of the radial rib-like core portion 1b so that the axial height can be heightened and the radial thickness can be thinned.

As described above, the core pieces constituting the facing core portion 1c and the partial laminating core 3 are respectively formed of an integral annular member. As illustrated in FIG. 3, each core piece of the partial laminating core 3 is press-formed such that a joint portion 3a thereof is thinner than the original plate. With this structure, a high magnetic resistance is obtained at the joint portion 3a to prevent the magnetic flux from leaking.

The same high magnetic resistance can be obtained by making the width of the core piece constituting each layer of the partial laminating core 3 and the facing core portion 1c narrower than the plate thickness at the joint portion, or giving a mechanical distortion to the joint portion of the core piece constituting each layer of the facing core portion 1c.

Further, as illustrated in FIG. 4, the core piece 3b which has the joint portions at predetermined places in the circumferential direction and the core piece 3c which is split in separate units at the aforementioned predetermined places may be cooperatively used and laminated alternating by multiple layers so that excellent mechanical strength can be obtained while the leakage of the magnetic flux is reduced.

Figure 6:
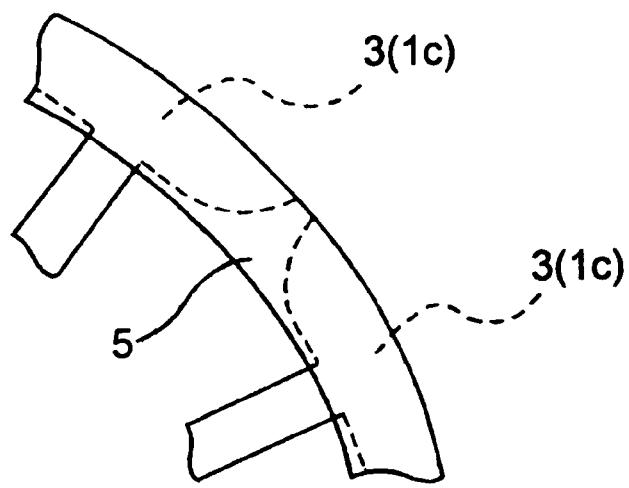
FIG. 6 is a partial plan view of another structure of the partial laminating core of FIG. 5.

Also, as illustrated in FIGS. 5 and 6, a joining plate 5 made of an integral annular non-magnetic member which is continuous in the circumferential direction is attached to both ends in the lamination direction of the laminated unit of the facing core portion 1c and the partial laminating core 3 which is split in separate units in the circumferential direction, so that excellent mechanical strength can be obtained while the leakage of the magnetic flux is reduced. A joining plate 5 made of an integral annular non-magnetic material can be buried in the central portion in the lamination direction of the facing core portion 1c.

Moreover, although not illustrated, a joining plate made of a non-magnetic material may be press-fitted, for example, by a press, to the gap portion between the facing core portion 1c and each of the circumferentially split partial laminating core 3 which are adjacent to one another. Or, the entire laminated core 1 having the facing core portion 1c and the circumferentially split partial laminating core 3 may be adhered by an insert-molding. Even with the above structure, excellent mechanical strength can be obtained while the leakage of the magnetic flux is reduced.

Figure 7:
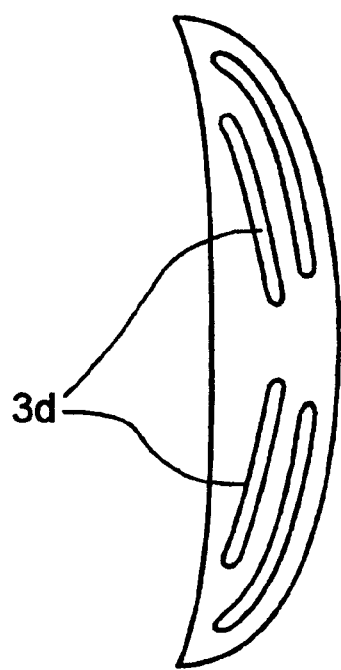
FIG. 7 is a plan view of an insulation slit cut in the core piece.

If the core pieces constituting the laminated core 1 and the partial laminating core 3 in this embodiment is made of a silicon steel plate with no insulation coating, the flow of the magnetic flux in the lamination direction (axial direction) can be improved. In addition, in the core pieces constituting the partial laminating core 3, an insulation slit 3d extending in multiple lines, as illustrated in FIG. 7, is formed if needed. The insulation slit 3d functions to prevent the generation of eddy currents which are generated by the magnetic flux passing the partial laminating cores 3 in the lamination direction (axial direction). Note that it is possible to form the integral laminated core 1 including the partial laminating core 3 of the identical core pieces.

Such a structure can be adopted to a rotor of an inductance machine in the same manner, as illustrated in FIGS. 8 and 9.

That is, as illustrated in the same figures, a plurality of rib-like core portions 13b are integrally formed with an annular core portion 13a of a laminated core 13 fixed to a rotary shaft 12 such that they extend radially and are spaced at a predetermined interval in the circumferential direction; a conductive portion (not illustrated) formed of an aluminum die casting is filled partially or entirely in each slot created between the rib-like core portions 13b that are adjacent in the circumferential direction. At the radially outer edge portion of each rib-like core portion 13b, a facing core portion 13c (magnetic pole portion) is provided to face a stator 14.

The laminated core 13 is made by axially laminating the core pieces of silicon steel plate which are punched out in a predetermined shape. On the laminated unit of the facing core portion 13c for which the core pieces in the shape as illustrated in FIG. 9 are layered in a predetermined height, the core pieces in the shape corresponding to that of the facing core portion 13c is further laminated. In other words, the lamination base of the core piece having the radial rib-like core portion 13b and facing core portion 13c constitutes the axially central portion of the laminated core 13, and the partial laminating core 15 is further laminated axially at both ends of the facing core portion 13c of the laminated unit. The core pieces constituting the partial laminating core 15 and the laminated core 13 are fixed by a lamination caulking. The partial laminating core 15 at this time may be extended from the facing core portion 13c to the radial rib-like core portion 13b.

The partial laminating core 15 enlarges the surface facing the stator 14 in the axial direction. The total lamination thickness of the partial laminating core 15 and the facing core portion 13c in the axial direction (lamination direction) is larger than the thickness of the radial rib-like core portion 13b. Because each of the facing core portion 13c is integrally formed with the annular core portion 13a, a sufficient mechanical strength can be obtained at the joint portion between the facing core portion 13c and the annular core portion 13a, even when an insulation slit 16 for reducing the leakage of the magnetic flux is formed between the facing core portions 13c that are adjacent in the circumferential direction.

In this case, even when a joining plate made of an integral annular non-magnetic member that is continuous in the circumferential direction is attached to both ends in the lamination direction of the laminated unit of the facing core portion 13 and the circumferentially split partial laminating core 15 (see FIGS. 5 and 6), excellent mechanical strength, can be obtained while the leakage of the magnetic flux is reduced. A joining plate made of an integral annular non-magnetic member can be buried in the center portion in the lamination direction of the facing core portion 13c.

It is also possible to employ a structure, in which the circumferentially adjacent partial laminating cores 15 and the facing core portions 13c are integrally connected. In this case, to prevent the leakage of the magnetic flux from occurring, it is desirable that the joint portions may be press-formed to be thinner than the thickness of the original plate (see FIG. 3), the width of the core piece constituting each layer of the partial laminating core 15 and the facing core portion 13 may be made narrower than the original plate thickness at the joint portion, or a mechanical distortion is given to the joint portions of the core piece constituting each layer of the partial laminating core 15 and the facing core portion 13c.

In addition, the core pieces of the facing core portion 1c and the partial laminating core 15 having the joint portions and the core pieces which are split in separate units are cooperatively used and laminated alternating by multiple layers (see FIG. 4), excellent mechanical strength can be obtained while the leakage of the magnetic flux is reduced.

On the other hand, in a rotor 11 of such a inductance machine, it is possible that an electrically connected ring made of a copper material is provided at both ends of the conductive portion and the conductive portions are connected to form a closed circuit. The electrically connected ring can be formed by laminating the press-formed copper material. In this case, a bar-like copper material can be inserted to the slot portion of the armature to make a part of the conductive portion.

The embodiments of the invention by the present inventor has been described specifically. However, the present invention is not limited to the above mentioned embodiments, but it should be understood that it is modifiable within the scope of the invention.

Figure 10:
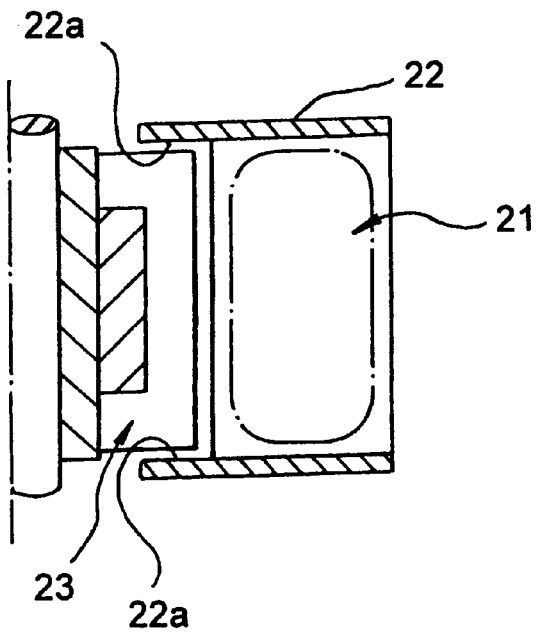
FIG. 10 is a schematic vertical cross-sectional view showing another embodiment of the laminated core of the present invention.
Figure 11:
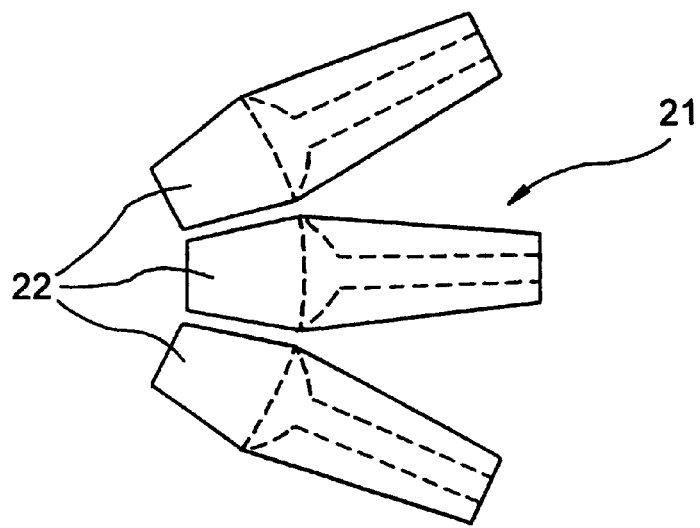
FIG. 11 is a plan view of the laminated core of FIG. 11.
Figure 12:
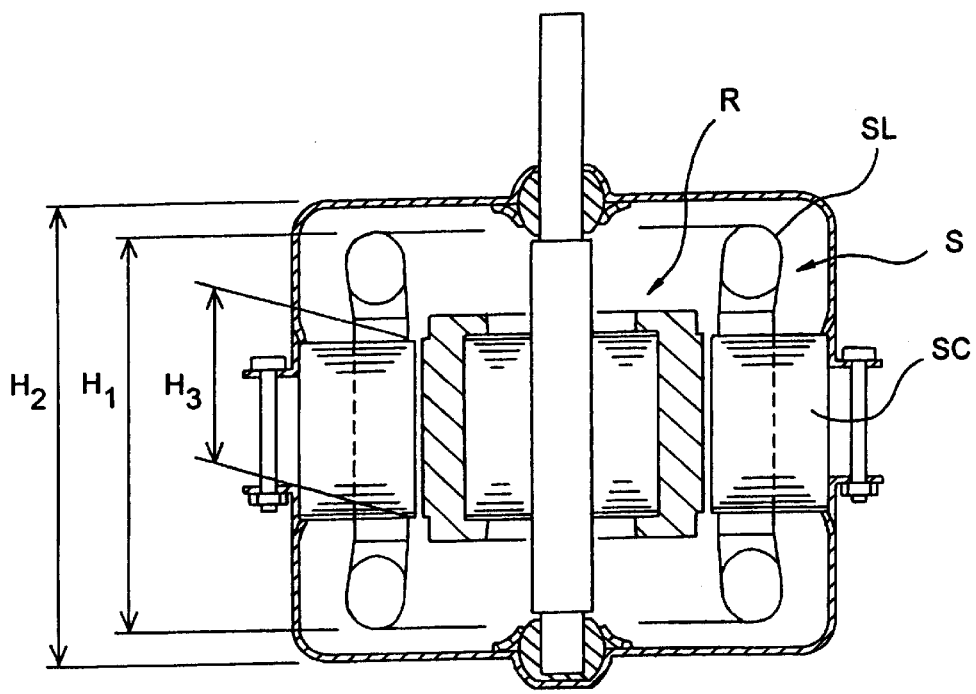
FIG. 12 is a vertical cross-sectional view of a structural example of a conventional rotating electric machine.
Figure 13:
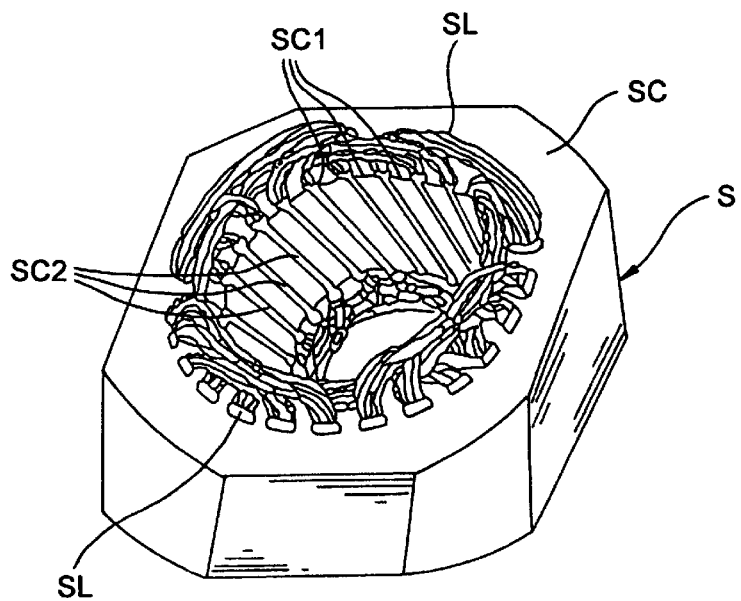
FIG. 13 is a perspective outlook showing a winding structure in the rotating electric machine of FIG. 12.

For example, in another embodiment illustrated in FIGS. 10 and 11, provided at the partial laminating core 22 laminated on the facing core portion of a stator 21 is the axially facing surface 22a as well as the radially facing surface with resect to the rotor 23. The facing area is increased with these facing surfaces. The axially facing surface 22a at the partial laminating core 22 is enlarged with the extension in either the circumferential direction or the radius direction, and also provided in pair sandwiching the rotor 23 in the axial direction.

The present invention can also be applied to an armature constituting a stator of an inductance machine in the same manner. Further, in magnetic type rotating electric machines or reluctance type rotating electric machines, the present invention can be applied to an armature having a distributed winding structure in which a coil of one phase per one pole is stored in a slot formed in multiple.

In the same manner, the present invention can be applied, in magnetic type rotating electric machines or reluctance type rotating electric machine, to an armature in which a concentrated winding is given to store a coil of one phase per pole within a slot.

At this time, it is particularly preferred that the radial rib-like core portion is formed separately from the facing core portion or the annular core portion. A coil is first wound about the separate radial rib-like core portion, and then, coupled with the facing core portion or the annular core portion.

In each of the above mentioned embodiments, the present invention is applied in an inner rotor type, but also can be applied in an outer rotor type.

The present invention can be applied not only to the motors in the above mentioned embodiments, but also to generators.

As described above, according to the present invention, the radial rib winding and the partial laminating core are cooperatively used to fully utilize the space in the height direction, which is a drawback of the conventional structure. Also, as the coil component will not be degraded, the proportional constant that determines the relationship between the torque and the copper loss is greatly improved. Thus, the loss is remarkably reduced, resulting in greatly improving the efficiency value and property of the rotating electric machine.

While the foregoing description and drawings represent the preferred embodiments of the present invention, it will be obvious to those skilled in the art that various changes and modifications may be made therein without departing from the true spirit and scope of the present invention.

What is claimed is:

1. A structure of an armature of a radial rib winding type rotating electric machine, which constitutes at least a member of a stator or a rotor, comprising:
   a laminated core having an annular core portion;
   a radial rib-like core portion that extends radially from said annular core portion toward an opposing member;
   a facing core portion that is formed at the edge of said radial rib-like core portion to face to said opposing member;
   a coil being wound about said radial rib-like core portion of said laminated core;
   a partial laminating core being laminated on at least said facing core portion of said armature to enlarge the facing surface thereof opposite said opposing member;
   wherein the total lamination thickness of said facing core portion and partial laminating core portion is larger than the thickness of said radial rib-like core portion;

wherein a core piece constituting each layer of said facing core portion is formed of a plate-like member that is integral in the circumferential direction; said plate-like member having a joint portion that has a high magnetic resistance; and said core piece constituting each layer of said facing core portion is formed thinner than the thickness of an original plate to have a high magnetic resistance at said joint portion.

2. The structure of an armature of a radial rib winding type rotating electric machine as set forth in claim 1 wherein said core piece constituting each layer of said facing core portion is formed narrower than the thickness of the plate to have a high magnetic resistance at said joint portion.

3. The structure of an armature of a radial rib winding type rotating electric machine as set forth in claim 1 wherein a mechanical distortion is given to said core piece constituting each layer of said facing core portion to obtain a high magnetic resistance.

4. The structure of an armature of a radial rib winding type rotating electric machine as set forth in claim 1 wherein said core pieces of said facing core portion having joint portions and said core pieces separately formed and split, are cooperatively laminated.

5. The structure of an armature of a radial rib winding type rotating electric machine as set forth in claim 1 wherein, to both ends in the lamination direction of said facing core portion, a joining plate made of an integral annular non-magnetic member that is continuous in the circumferential direction is attached.

6. The structure of an armature of a radial rib winding type rotating electric machine as set forth in claim 5 wherein, in the central portion in the lamination direction of said facing core portion, said joining plate made of an integral annular non-magnetic material that is continuous in the circumferential direction is buried in a center portion.

7. The structure of an armature of a radial rib winding type rotating electric machine as set forth in claim 1 wherein each of said facing core portions is split in the circumferential direction, and a joining plate made of a non-magnetic material is press-fitted into a gap between adjacent facing core portions to annularly connect each facing core portion with each other.

8. The structure of an armature of a radial rib winding type rotating electric machine as set forth in claim 1 wherein said facing core portion is split in the circumferential direction, and the entire laminated core is fixed by insert-molding.

9. The structure of an armature of a radial rib winding type rotating electric machine as set forth in claim 1 wherein an end surface of said facing core portion on the radial rib-like core portion side is formed to extend perpendicular to the projecting direction of said radial rib-like core portion or in the circumferential direction.

10. The structure of an armature of a radial rib winding type rotating electric machine as set forth in claim 1 wherein the thickness of said annular core portion in the lamination direction is larger with respect to that of said radial rib-like core portion in the lamination direction.

11. The structure of an armature of a radial rib winding type rotating electric machine as set forth in claim 1 wherein, to said partial laminating core laminated on said facing core portion, a radially facing surface and an axially facing surface that respectively face an opposing member in the radial and axial directions are provided.

12. The structure of an armature of a radial rib winding type rotating electric machine as set forth in claim 11 wherein said axially facing surface of said partial laminating core is enlarged in the circumferential or radius direction to increase the facing area.

13. The structure of an armature of a radial rib winding type rotating electric machine as set forth in claim 11 wherein said axially facing surface of said partial laminating core at the end is projected to face said opposing member on the other side in the axial direction.

14. The structure of an armature of a radial rib winding type rotating electric machine as set forth in claim 11 wherein, at axially both ends of said armature, axially facing surfaces that face said opposing member are provided.

15. The structure of an armature of a radial rib winding type rotating electric machine as set forth in claim 1 wherein said laminated core portion and said partial laminating core are formed of silicon steel plates.

16. The structure of an armature of a radial rib winding type rotating electric machine as set forth in claim 15 wherein, in said silicon steel plates of said laminated core and said partial laminating core, an insulation coating is not given on both surfaces in the plate thickness direction.

17. The structure of an armature of a radial rib winding type rotating electric machine as set forth in claim 15 wherein insulation slits extending along the flow of a magnetic flux are cut in said partial laminating core.

18. The structure of an armature of a radial rib winding type rotating electric machine as set forth in claim 1 wherein said armature is a rotor of an inductance machine.

19. The structure of an armature of a radial rib winding type rotating electric machine as set forth in claim 18 wherein insulation slits for reducing the leakage of the magnetic flux are provided at portions between circumferentially adjacent facing core portions of said laminated core.

20. The structure of an armature of a radial rib winding type rotating electric machine as set forth in claim 18 wherein said partial laminating core is extended from said facing core portion to said radial rib-like core portion.

21. The structure of an armature of a radial rib winding type rotating electric machine as set forth in claim 18 wherein said facing core portions of said laminated core that are adjacent in the circumferential direction are formed in separate units, and a joining plate made of an integral annular non-magnetic member, which is continuous in the circumferential direction, is attached at both ends of each facing core portion in the lamination direction.

22. The structure of an armature of a radial rib winding type rotating electric machine as set forth in claim 18 wherein said facing core portions that are adjacent in the circumferential direction are connected with one another.

23. The structure of an armature of a radial rib winding type rotating electric machine as set forth in claim 22 wherein a core piece constituting each layer of said facing core portion is formed of a plate-like member, which is integral in the circumferential direction.

24. The structure of an armature of a radial rib winding type rotating electric machine as set forth in claim 23 wherein said core piece constituting each layer of said facing core portion is formed thinner than the thickness of an original plate to obtain a high magnetic resistance at said joint portion.

25. The structure of an armature of a radial rib winding type rotating electric machine as set forth in claim 23 wherein said core piece constituting each layer of said facing core portion is formed narrower than the thickness of the plate to obtain a high magnetic resistance at said joint portion.

26. The structure of an armature of a radial rib winding type rotating electric machine as set forth in claim 23 wherein a mechanical distortion is given to said core piece constituting each layer of said facing core portion to obtain a high magnetic resistance at said joint portion.

27. The structure of an armature of a radial rib winding type rotating electric machine as set forth in claim 23 wherein said core piece of said facing core portion having joint portions and said separately split-formed core pieces are combined for lamination.

28. The structure of an armature of a radial rib winding type rotating electric machine as set forth in claim 18 wherein a conductive portion formed of an aluminum die casting is filled partially or entirely in each slot created between said rib-like core portions that are adjacent in the circumferential direction.

29. The structure of an armature of a radial rib winding type rotating electric machine as set forth in claim 28 wherein said electrically connected ring made of a copper material is provided at both ends of the conductive portion and the conductive portions are connected to form a closed circuit.

30. The structure of an armature of a radial rib winding type rotating electric machine as set forth in claim 29 wherein an electrically connected ring is formed by laminating press-formed copper materials.

31. The structure of an armature of a radial rib winding type rotating electric machine as set forth in claim 18 wherein a bar-like copper material is inserted in a slot portion of said armature to constitute a portion of a conductive portion.

32. The structure of an armature of a radial rib winding type rotating electric machine as set forth in claim 1 wherein said armature is a stator of an inductance machine.

33. The structure of an armature of a radial rib winding type rotating electric machine as set forth in claim 1 wherein said armature is of a magnetic rotating electric machine, in which a coil is wound with a distributed winding such that one phase of said coil per pole is stored within a slot created in multiple.

34. The structure of an armature of a radial rib winding type rotating electric machine as set forth in claim 1 wherein said armature is of a reluctance type rotating electric machine, in which a coil is wound with a distributed winding such that one phase of said coil per pole is stored within a slot created in multiple.

35. The structure of an armature of a radial rib winding type rotating electric machine as set forth in claim 1 wherein said armature is of a magnetic rotating electric machine or a reluctance type rotating electric machine, in which a coil is wound with a concentrated winding such that each phase of said coil per each pole is stored within a slot created in plural.

36. The structure of an armature of a radial rib winding type rotating electric machine as set forth in claim 35 wherein said radial rib-like core portion is formed separately from said facing core portion or said annular core portion; a coil is first wound about said separate radial rib-like core portion, and then, said radial rib-like core portion is coupled with said facing core portion or said annular core portion.

37. The structure of an armature of a radial rib winding type rotating electric machine as set forth in claim 1 wherein said rotating electric machine employs an inner rotor structure.

38. The structure of an armature of a radial rib winding type rotating electric machine as set forth in claim 1 wherein said rotating electric machine employs an outer rotor structure.

* * * * *